(12) United States Patent
Diab (10) Patent No.: US 8,259,716 B2
(45) Date of Patent: *Sep. 4, 2012

(54) METHOD AND SYSTEM FOR PHYSICAL SIGNALING BETWEEN A HIGHER LAYER AND A PHY TO MANAGE ENERGY EFFICIENT NETWORK DEVICES AND/OR PROTOCOLS

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 12/471,861

(22) Filed: May 26, 2009

(65) Prior Publication Data

US 2010/0111081 A1    May 6, 2010

Related U.S. Application Data

(60) Provisional application No. 61/111,653, filed on Nov. 5, 2008.

(51) Int. Cl.
H04L 12/28    (2006.01)

(52) U.S. Cl. ...................................................... 370/389

(58) Field of Classification Search .................. 370/389, 370/392, 401, 395.52, 463, 419, 503
See application file for complete search history.

(56) References Cited

U.S. PATENT DOCUMENTS

| | | |
|---|---|---|
| 6,795,450 B1 | 9/2004 | Mills et al. |
| 7,603,574 B1 * | 10/2009 | Gyugyi et al. ................ 713/300 |
| 2005/0114663 A1 * | 5/2005 | Cornell et al. ................ 713/168 |
| 2006/0034295 A1 | 2/2006 | Cherukuri et al. |
| 2007/0280239 A1 | 12/2007 | Lund |

* cited by examiner

*Primary Examiner* — Man Phan
*Assistant Examiner* — Nourali Mansoury
(74) *Attorney, Agent, or Firm* — Duane S. Kobayashi (57) ABSTRACT

In an Ethernet network comprising link partners coupled via an Ethernet link, an energy efficient Ethernet network communication control policy may specify a power level mode. Power level control data may be communicated between a PHY and a MAC via an MII, MDIO or a bus that is not specified by 802.3. A device above a MAC layer device may comprise hardware, software and/or firmware that may communicate the control policy to the PHY layer device and/or MAC layer device. Control data may be inserted within an inter-packet gap, a data packet preamble and/or a Q ordered set and/or may be sent via an out-of-band signal. A response to the control data may be sent via an in band path and/or out of band path. Link partners may enter and/or exit a power mode, for example, a low power idle and/or a sub-rate mode based on the communicated control data.

11 Claims, 7 Drawing Sheets

METHOD AND SYSTEM FOR PHYSICAL SIGNALING BETWEEN A HIGHER LAYER AND A PHY TO MANAGE ENERGY EFFICIENT NETWORK DEVICES AND/OR PROTOCOLS

CROSS-REFERENCE TO RELATED APPLICATIONS/INCORPORATION BY REFERENCE

This application makes reference to, claims priority to, and claims the benefit of U.S. Provisional Application Ser. No. 61/111,653, filed on Nov. 5, 2008.

This application also makes reference to:
U.S. patent application Ser. No. 12/470,785 filed on May 22, 2009;
U.S. patent application Ser. No. 12/470,970 filed on May 22, 2009;
U.S. patent application Ser. No. 11/685,554 filed Mar. 13, 2007; and
U.S. patent application Ser. No. 11/473,205 filed Jun. 22, 2006.

Each of the above stated applications is hereby incorporated herein by reference in its entirety.

FIELD OF THE INVENTION

Certain embodiments of the invention relate to networking. More specifically, certain embodiments of the invention relate to a method and system for physical signaling between a higher layer and a PHY to manage energy efficient network devices and/or protocols.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular.

These recent developments have led to increased demand on datacenters, aggregation, high performance computing (HPC) and core networking. As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Most networks adhere to the layered approach provided by the open systems interconnect (OSI) reference model. The OSI reference provides a seven (7) layer approach, which includes an application layer, (Layer 7), a presentation layer (Layer 6), a session layer (Layer 5), a transport layer (Layer 4), a network layer (Layer 3), a data link layer (Layer 2) and a physical layer (Layer 1). Layer 7 through layer 5 inclusive may comprise upper layer protocols, while layer 4 through layer 1 may comprise lower layer protocols. Some networks may utilize only a subset of 7 layers. For example, the TCP/IP model, or Internet Reference model generally utilizes a fiver layer model, which comprises an application layer, (Layer 7), a transport layer (Layer 4), a network layer (Layer 3), a data link layer (Layer 2) and a physical layer (Layer 1). These five layers can be broken down into a fairly specific set of responsibilities or services, which they provide.

Layer 7, the application layer, is typically responsible for supporting network applications such as web browsers and email clients, and is typically implemented in software in end systems such as personal computers and servers. Typical layer 5 protocols comprise HTTP to support the World Wide Web, and SMTP to support electronic mail.

Layer 6, the presentation layer, is typically responsible for masking any differences in data formats that may occur between dissimilar or disparate systems. The presentation layer specifies architecture independent data transfer formats and may enable encoding, decoding, encryption, decryption, compression and/or decompression of data.

Layer 5, the session layer, is typically responsible for managing user session dialogues. In this regard, the session layer may be enabled to control establishment and/or termination of logical links between users. The session layer may also be enabled to provide handling and reporting of upper layer errors.

Layer 4, the transport layer, is typically responsible for passing application layer messages between the client and server sides of an application. In this regard, the transport layer may be enabled to manage end-to-end delivery of messages in the network. The transport layer may comprise various error recovery and/or flow control mechanisms, which may provide reliable delivery of messages. By far the two most common Layer 4 protocols are transmission control protocol (TCP) and user datagram protocol (UDP), which are used in the Internet.

Layer 3, the network layer, is typically responsible for determining how data may be transferred between network devices. Data may be routed according to unique network addresses. In this regard, the network layer may route, for example, datagrams between end systems. Internet Protocol (IP), for example, defines the form and content of the datagrams and is implemented in Layer 3 in combination with any number of routing protocols which may be implemented in the various nodes (devices such as bridges and routers) along a datagram's path from one end system to another.

Layer 2, the data link layer, is typically responsible for moving a packet of data from one node to another. The data link layer defines various procedures and mechanisms for operating communication links and may enable, for example, the framing of packets within the network. The data link layer may enable detection and/or correction of packet errors. The Ethernet (IEEE 802.3) protocol is one common link layer protocol that is used in modern computer networks.

Layer 1, the physical layer, is typically responsible for defining the physical means, which may comprise optical, electrical and/or mechanical means for communicating data via network devices over a communication medium. The converting the bit stream from Layer 2 into a series of physical signals for transmission over a medium. Layer 2 technologies such as Ethernet may implement a number of Layer 1 protocols depending on whether the signal is to be transmitted over twisted-pair cabling or over-the-air for example.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for physical signaling between a higher layer and a PHY to manage energy efficient network devices and/or protocols, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for physical signaling between a higher layer and a PHY to manage energy efficient network devices and/or protocols. In an Ethernet network comprising link partners that are coupled via an Ethernet link, a communication control policy is provided that specifies a power level mode for one or more of the link partners. Control data indicating the power level mode may be communicated between a physical layer device and a media access controller for the one or more of the link partners. In this manner, one or more of the link partners may operate in the specified power level mode based on the communicated control data. Furthermore, one or more of the link partners may be configured for operation in the power level mode. One or more layers above an OSI media access controller layer in one or both of the link partners, may comprise hardware, software and/or firmware that may be operable to manage communication and/or operation of the control policy. In this regard, control data may be inserted within an inter-packet gap, a data packet preamble and/or Q ordered sets to enable communication of the control data. The control data may be communicated to one or both of the physical layer device and the media access controller, for the one or more of the link partners. The control data may be communicated between the media access controller and the physical layer device via one or more of a media independent interface, a management data input output interface and a bus that may not be specified by 802.3. Accordingly, one or more of the link partners may enter and/or exit a low power mode based on the communicated control data. Packet data that is pending delivery during a change in power level mode may be buffered in one or both of the physical layer device and/or the media access controller. Exemplary power level modes may comprise a low power idle and/or a sub-rate mode. In this regard, the communication control policy may comprise an energy efficient networking (EEN) control policy.

Figure 1:
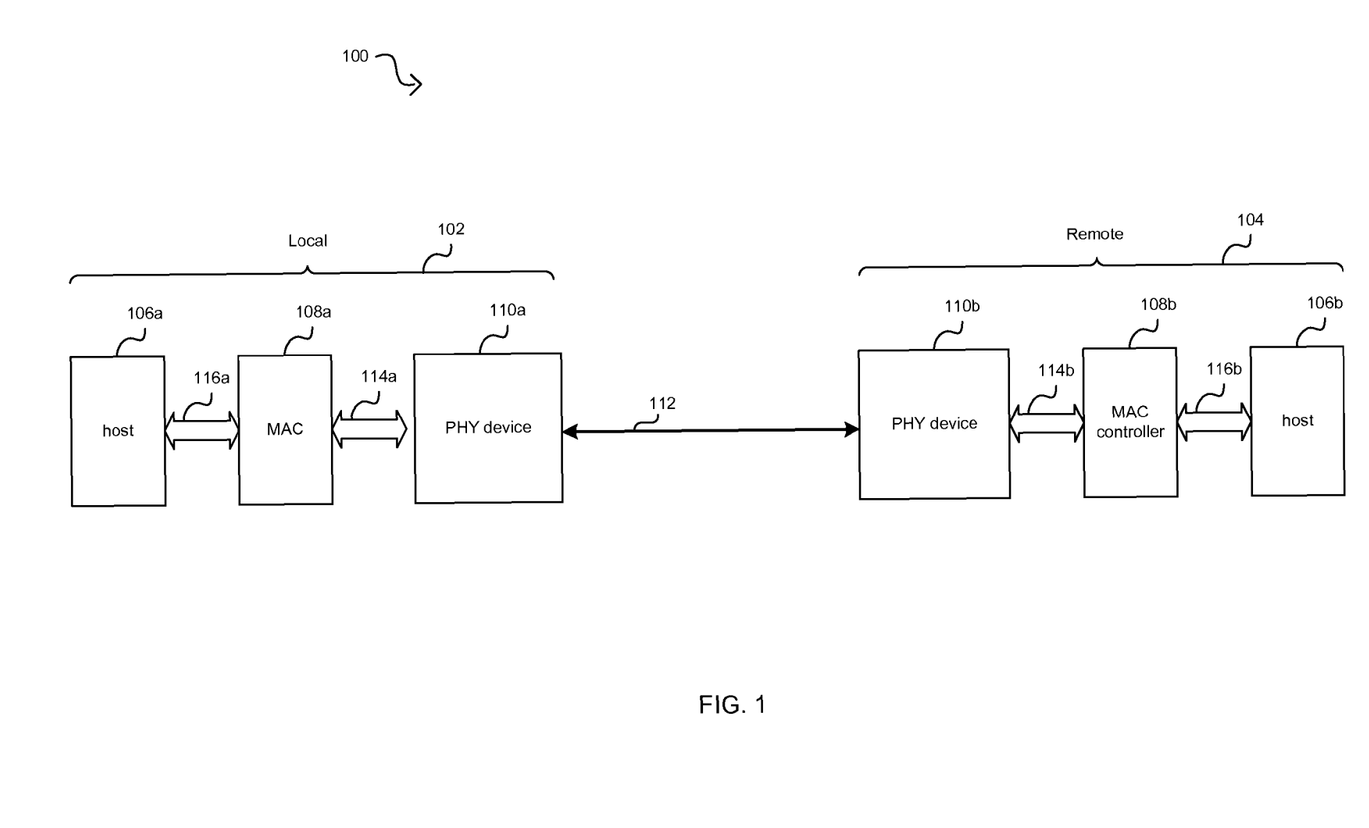
FIG. 1 is a block diagram illustrating an exemplary Ethernet connection between two network devices, in accordance with an embodiment of the invention.

FIG. 1 is a block diagram illustrating an exemplary Ethernet connection between a two network devices, in accordance with an embodiment of the invention. Referring to FIG. 1, there is shown a system 100 that comprises a network device 102 and a network device 104. In addition, there is shown two hosts 106a and 106b, two MAC controllers 108a and 108b, two PHY devices 110a and 110b, two controllers 114a and 114b, two bus controller interfaces 116a and 116b and a link 112

The network devices 102 and 104 may communicate via the link 112. The Ethernet link 112 is not limited to any specific medium and may utilize any suitable medium. Exemplary Ethernet link 112 media may comprise copper, optical and/or backplane technologies. For example, a copper medium such as STP, Cat 3, Cat 5, Cat 5e, Cat 6, Cat 7 and/or Cat 7a as well as ISO nomenclature variants may be utilized. Additionally, copper media technologies such as InfiniBand, Ribbon and backplane may be utilized. With regard to optical media for the Ethernet link 112, single mode fiber as well as multi-mode fiber may be utilized.

In an exemplary embodiment of the invention, the link 112 may comprise up to four or more physical channels, each of which may, for example, comprise an unshielded twisted pair (UTP). The network device 102 and the network device 104 may communicate via two or more physical channels comprising the link 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP. In this regard, however, aspects of the invention may enable varying the number of physical channels via which data is communicated.

In an exemplary embodiment of the invention, the network devices 102 and/or 104 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In another exemplary embodiment of the invention, the network devices 102 and/or 104 may comprise a backplane PHY capable of operating at one or more standard rates such as 10 Gbps (10GBASE-KX4 and/or 10GBASE-KR); and/or non-standard rates such as 2.5 Gbps and 5 Gbps.

In another exemplary embodiment of the invention, the network devices 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

In addition, the network devices 102 and/or 104 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the network devices 102 and/or 104.

The network device 102 may comprise a host 106a, a medium access control (MAC) controller 108a, and a PHY device 104a. The network device 104 may comprise a host 106b, a MAC controller 108b, and a PHY device 110b. Notwithstanding, the invention is not limited in this regard. In various embodiments of the invention, the network device 102 and/or 104 may comprise, for example, one or more of a switch, end point, router, computer systems and/or audio/video (A/V) enabled equipment. In this regard, A/V equipment may, for example, comprise, a microphone, an instrument, a sound board, a sound card, a video camera, a media player, a graphics card, or other audio and/or video device. Additionally, the network devices 102 and 104 may be enabled to utilize Audio/Video Bridging and/or Audio/video bridging extensions (collectively referred to herein as audio video bridging or AVB) for the exchange of multimedia content and associated control and/or auxiliary data.

The PHY devices 110a and 110b may each comprise suitable logic, circuitry, and/or code that may enable communication, for example, transmission and reception of data, between the network device 102 and the network device 104. The PHY devices 110a and 110b may support, for example, Ethernet over copper, Ethernet over fiber, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rate limits and/or non-standard data rate limits. Moreover, the PHY devices 110a and 110b may support standard Ethernet link lengths or ranges of operation and/or extended ranges of operation. The PHY devices 110a and 110b may enable communication between the network device 102 and the network device 104 by utilizing a link discovery signaling (LDS) operation that enables detection of active operations in the other network device. In this regard the LDS operation may be configured to support a standard Ethernet operation and/or an extended range Ethernet operation. The PHY devices 110a and 110b may also support autonegotiation, which may for example, be utilized to identify and/or select communication parameters such as speed and duplex mode.

In various embodiments of the invention, the PHY devices 110a and 110b may comprise suitable logic, circuitry, and/or code that may enable transmission and/or reception at a high (er) data in one direction and transmission and/or reception at a low(er) data rate in the other direction. For example, the network device 102 may comprise a multimedia server and the network device 104 may comprise a multimedia client. In this regard, the network device 102 may transmit multimedia data, for example, to the network device 104 at high(er) data rates while the network device 104 may transmit control or auxiliary data associated with the multimedia content at low (er) data rates.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example.

In an exemplary embodiment of the invention illustrated in FIG. 1, the hosts 106a and 106b may implement layer 3 and above, the MAC controllers 108a and 108b may implement layer 2 and above and the PHY devices 110a and 110b may implement the operability and/or functionality of layer 1 or the physical layer. In this regard, the PHY devices 110a and 110b may be referred to as physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the link 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers. The hosts 106a and/or 106b may comprise management and control functions that may be implemented by software, hardware and/or a combination of software and hardware. In addition, the hosts 106a and 106b may be operable to communicate with the PHY devices 110a and 110b respectively via a general purpose input output (GPIO) bus (shown in FIG. 3), for example.

The PHY devices 110a and 110b may be configured to handle physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may comprise data and header information for each of the above six functional layers. The PHY devices 110a and 110b may be configured to encode data packets that are to be transmitted over the link 112 and/or to decode data packets received from the link 112.

The MAC controller 108a may comprise suitable logic, circuitry, and/or code that may enable handling of data link layer, layer 2, operability and/or functionality in the network device 102. Similarly, the MAC controller 108b may comprise suitable logic, circuitry, and/or code that may enable handling of layer 2 operability and/or functionality in the network device 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate capable interfaces. The interfaces 114a and/or 114 by may comprise a media independent interfaces (MII). In addition the interfaces 114a and/or 114b may comprise a management data input output (MDIO) interface that may be operable to communicate control plane information between the MAC controller 108a and the PHY device 110a, for example. In this regard, the host 106 may be operable to access registers within the PHY device 110 via the MDIO bus. The registers (shown in FIG. 3) may comprise configuration parameters for the PHY device 110a. The bus controller interfaces 116a and 116b may correspond to PCI or PCI-X interfaces. Notwithstanding, the invention is not limited in this regard.

In operation, PHY devices such as the PHY devices 110a and 110b may conventionally transmit data via a fixed number of physical channels having a fixed data rate limit which may result in network links being underutilized and transmitting IDLE symbols for significant portions of time. In this regard, when the network devices 102 and 104 initiate a connection, they may exchange some preliminary information and/or training signals. In this regard, the network devices 102 and 104 may negotiate a data rate limit (e.g., 10 Gbps) and duplex mode (e.g., full-duplex) for communicating with each other. Additionally, in order to establish reliable communications, each of the network devices 102 and 104 may need to "train" or adjust various parameters and/or circuitry in a network device to account for variables such as the type of cabling over which data is being communicated and the environmental conditions (e.g. temperature) surrounding the cabling. Once the network devices are "trained", they may initially transmit data at 10 Gbps, for example. In this regard, conventional PHY devices may distribute traffic evenly over all available physical channels and may continuously transmit IDLE symbols between packets of actual data. However, based, for example, on link utilization, past or present traffic statistics, and/or available resources (e.g., power, buffer space, processor time, etc.), it may be determined that 10 Gbps may be higher than necessary or desired.

Accordingly, controlling the data rate limit of the connection between the network devices 102 and 104 may enable the network devices 102 and 104 to communicate in a more energy efficient manner. Moreover, while the data rate limit on the link 112 may be low(er), higher layer functions and/or resources, such as portions of the MAC controller may be placed into a low(er) power mode. The data rate limit may be controlled by, for example, controlling a number of physical channels utilized to communicate data, controlling the signal constellation utilized for representing data on the link, controlling a rate at which symbols are transmitted, and controlling the length of time between frames (the inter-frame gap). In this manner, aspects of the invention may enable network designers and/or administrators to control, with fine precision via a plurality of data rate variables, a data rate limit on an Ethernet link.

At any given time instant, the data rate limit may determine the maximum data rate which the link may support at that instant. In instances that the actual data rate on the link is less than the data rate limit, the difference between the data rate limit and the actual data rate may correspond to wasted energy on the link and/or in network devices communicatively coupled to the link. Accordingly, the increased resolution with which the data rate limit may be controlled, via the plurality of variables, may enable reducing the difference between the data rate limit and the actual data rate; thus improving energy efficiency of the link and/or network devices communicatively coupled to the link.

In various embodiments of the invention, a data rate limit of a network link may be controlled to meet demands on the link, and this may result in a fixed actual data rate on the link which may effectively reduce or eliminate issues associated with links transporting bursty traffic. For example, controlling and/or determining traffic attributes (e.g., inter-frame gap times and network latencies) and/or network resources (e.g., buffer capacity and utilization) may be simplified when dealing with fixed rate traffic. Moreover, certain traffic types, such as video and audio streams, may inherently be of a fixed actual data rate and may thus lend themselves to efficient transmission over a link utilizing a fixed data rate limit.

Figure 2:
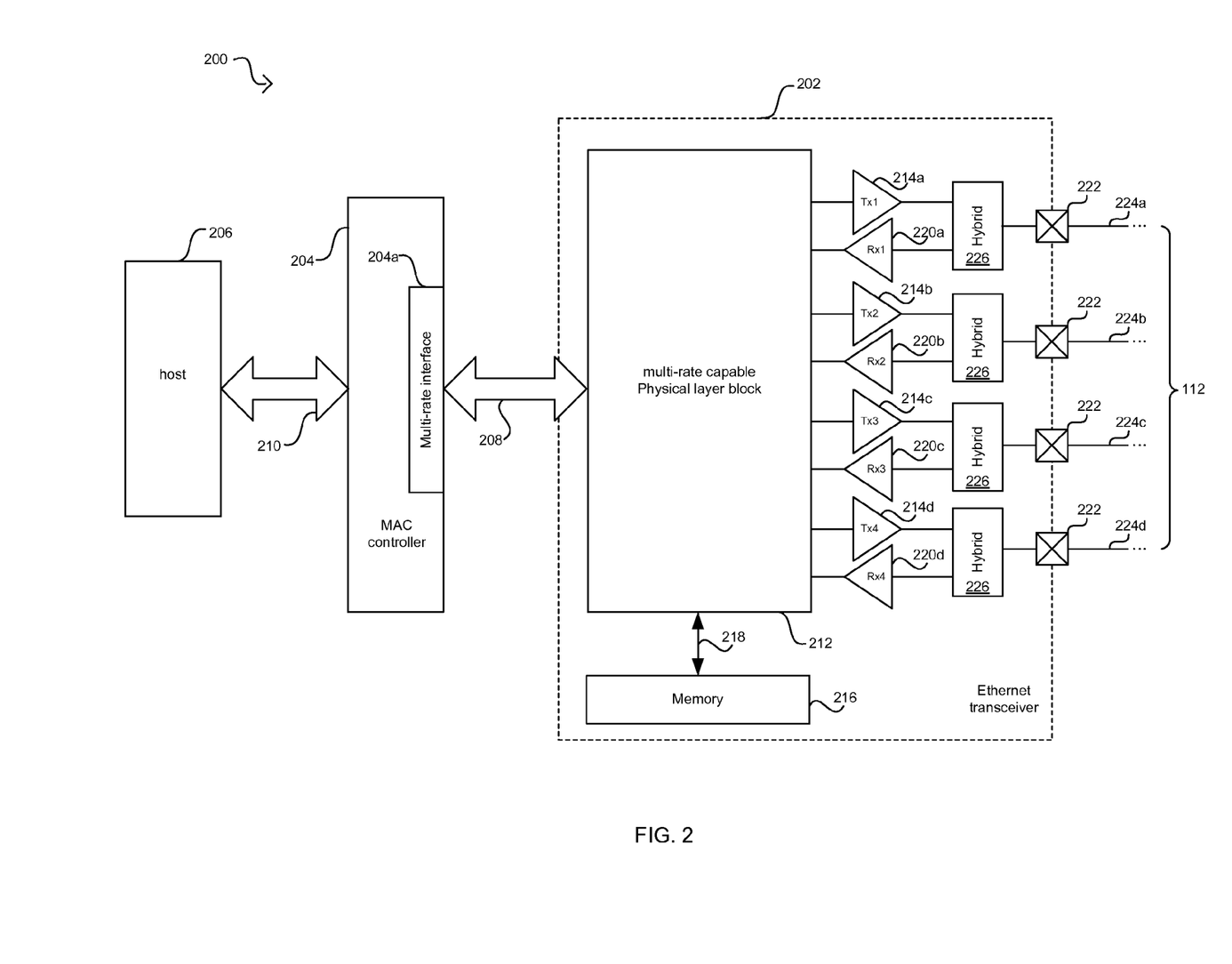
FIG. 2 is a block diagram illustrating an exemplary Ethernet over twisted pair PHY device architecture comprising a multi-rate capable physical block, in accordance with an embodiment of the invention.

FIG. 2 is a block diagram illustrating an exemplary Ethernet over twisted pair PHY device architecture comprising a multi-rate capable physical block, in accordance with an embodiment of the invention. Referring to FIG. 2, there is shown a network device 200 which may comprises an Ethernet over twisted pair PHY device 202, a MAC controller 204, a host 206, an interface 208, and a bus controller interface 210. The PHY device 202 may be an integrated device which may comprise a multi-rate capable physical layer block 212, one or more transmitters 214, one or more receivers 220, a memory 216, a memory interface 218, and one or more input/output interfaces 222.

The PHY device 202 may be an integrated device that comprises a multi-rate capable physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate capable interface 204a that may comprise suitable logic, circuitry, and/or code to enable communication with the PHY device 202 at a plurality of data rates via the interface 208.

The multi-rate capable physical layer block 212 in the PHY device 202 may comprise suitable logic, circuitry, and/or code that may enable operability and/or functionality of physical layer requirements. In this regard, the multi-rate capable physical layer block 212 may enable generating the appropriate link discovery signaling utilized for establishing communication with a remote PHY device in a remote network device. The multi-rate capable physical layer block 212 may communicate with the MAC controller 204 via the interface 208. In one aspect of the invention, the interface 208 may be a media independent interface (MII) and may be configured to utilize a plurality of serial data lanes for receiving data from the multi-rate capable physical layer block 212 and/or for transmitting data to the multi-rate capable physical layer block 212. The multi-rate capable physical layer block 212 may be configured to operate in one or more of a plurality of communication modes, where each communication mode may implement, for example, a different communication protocol. These communication modes may include, but are not limited to, Ethernet over twisted pair standards 10BASE-T, 100BASE-TX, 1000BASE-T, 10GBASE-T, and other similar protocols that utilize multiple physical channels between network devices. The multi-rate capable physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate capable physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate capable physical layer block 212. The parameters may comprise configuration data and the code may comprise operational code such as software and/or firmware, but the information need not be limited in this regard. Moreover, the parameters may include adaptive filter and/or block coefficients for use, for example, by the multi-rate capable physical layer block 212 and/or the hybrids 226.

Each of the transmitters 214a, 214b, 214c, 214d may comprise suitable logic, circuitry, interfaces and/or code that may enable transmission of data from the network device 200 to a remote network device via, for example, the link 112 in FIG. 1. The receivers 220a, 220b, 220c, 220d may comprise suitable logic, circuitry, interfaces and/or code that may enable receiving data from a remote network device. Each of the transmitters 214a, 214b, 214c, 214d and receivers 220a, 220b, 220c, 220d in the PHY device 202 may correspond to a physical channel that may comprise the link 112. In this manner, a transmitter/receiver pair may interface with each of the physical channels 224a, 224b, 224c, 224d. In this regard, the transmitter/receiver pairs may be enabled to provide the appropriate communication rate and mode for each physical channel.

The input/output interfaces 222 may comprise suitable logic circuitry, and/or code that may enable the PHY device 202 to impress signal information onto a physical channel, for example a twisted pair of the link 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium of the physical channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the network device 200 may comprise a number of hybrids 226 corresponding to the number of physical links. Each hybrid 226 may comprise suitable logic, circuitry, interface and/or code that may enable separating transmitted and received signals from a physical link. For example, the hybrids may comprise echo cancellers, far-end crosstalk (FEXT) cancellers, and/or near-end crosstalk (NEXT) cancellers. Each hybrid 226 in the network device 300 may be communicatively coupled to an input/output interface 222.

In operation, the network device 200 may communicate with a remote partner via the link 112. For example, for 10 Gbps Ethernet, the network device 200 may transmit data to and receive data from a remote partner via the physical channels 224a, 224b, 224c, and 224d. In this regard, when there is no data for the network device 200 to transmit, then it may transmit IDLE symbols to keep itself and/or the remote partner "trained". In this manner, power consumption of a network may be largely independent of the amount of actual data being transmitted over the network. Accordingly, controlling the data rate limit on the link 112 may enable the network devices 200 to transmit fewer IDLE symbols and thus communicate in a more energy efficient manner.

The network device 200 may disable, or put into a low(er) power state, one or more of the physical channels 224, when those one or more physical channels are not required to meet current and/or future demand of the link. In this manner, transmitters 214, receivers 220, hybrids 226, and/or portions of the multi-rate capable PHY block 212 associated with the unused physical channels may be disabled. A channel in a low(er) power state may operate in one or more ways. For example, one or more channels may convey little or no data, they may be silent, they may convey IDLE symbols and/or convey other energy. In some instances, all channels of a link may be placed into a low(er) power state. Furthermore, the PHY device 202 as well as the MAC controller 204 may be put to sleep.

The PHY device 202 and/or one or more components implementing layers above the PHY layer may be placed in a low power idle mode (LPI) wherein the PHY device 202 and/or higher level components may be powered down during idle periods. During power down, the PHY device 202 may maintain various coefficients and may maintain synchronization to allow for a more rapid return to an active state. In addition, during LPI mode, a portion of the receiver circuitry may be turned off. In asymmetric systems, devices that handle one direction of communication may be in a quiet state independent of devices that handle communication in an opposite direction. In synchronous systems, both the transmit and receive sides of a PHY device may enter and/or leave a quiet state together. Although a PHY device may operate in a synchronous mode, OSI layers above the PHY may operate in an asymmetric mode.

In various embodiments of the invention, a low(er) power state may be enabled wherein channels of a link may remain active and a data rate limit on each of the channels may be controlled by adjusting a signal constellation, PAM levels, an IFG, and/or a symbol rate.

Figure 3:
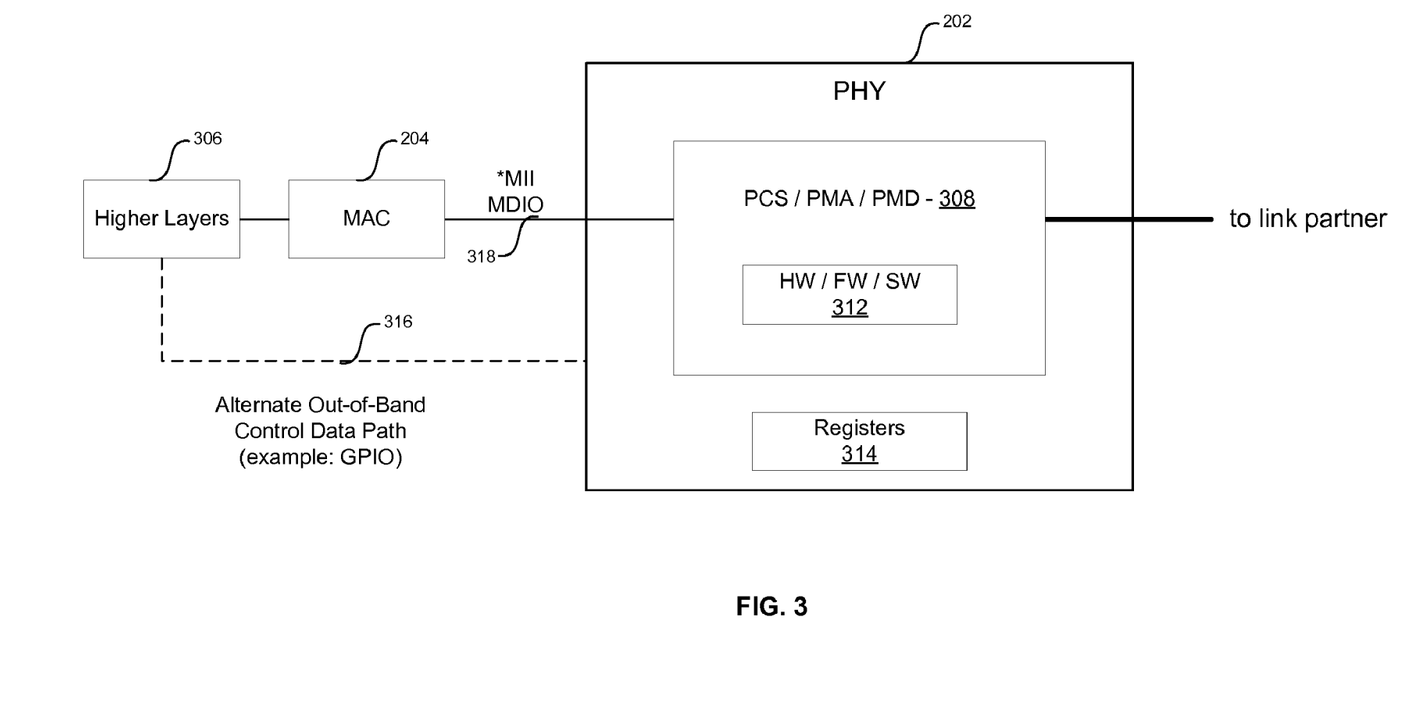
FIG. 3 is a block diagram illustrating an exemplary device that is operable to communicate in-band and/or out-of-band energy efficient Ethernet network control signals to and/or from a PHY device, in accordance with an embodiment of the invention.

FIG. 3 is a block diagram illustrating an exemplary device that is operable to communicate in-band and/or out-of-band EEN control signals to and/or from a PHY device, in accordance with an embodiment of the invention. Referring to FIG. 3, there is shown a block for layers above the MAC layer 306, the MAC controller 204, the PHY device 202, registers 314, an alternate signaling path 316 and a MAC-PHY interface 318. The PHY device 202 may comprise a physical coding sub-layer (PCS), physical media attachment (PMA) and/or physical media dependent (PMD) module 308. The PCS, PMA and PMD module 308 may comprise a hardware, firmware and/or software module 312.

The MAC controller 204 and the PHY device 202 are described with respect to FIG. 1 and FIG. 2. The layers above the MAC layer 306 comprise the host 206 and/or the interfaces 208 and 210 described with respect to FIG. 1 and FIG. 2. The MAC-PHY interface 318 may be similar or substantially the same as the interface 114 described with respect to FIG. 1. The MAC-PHY interface 318 may comprise suitable logic, circuitry, interfaces and/or code to implement a management data input output (MDIO) interface as well as a media independent interface (MII). The MDIO may provide access to internal registers of the PHY device 202.

The registers 314 may comprise configuration parameters that may enable the PHY device to enter and/or exit a low(er) power mode. The registers may be accessible by the layers above the MAC 306 via the MDIO bus.

The layers above the MAC layer 306 may comprise suitable logic, circuitry, interfaces and/or code to monitor hardware, firmware, software and/or one or more buses to determine when a low(er) power mode of operation may be sufficient to handle traffic flowing through the system 100. The layers above the MAC layer 306 may comprise the EEN control policy and may send EEN policy control signals to the PHY device 202. The physical signals may be communicated via in-band signals and/or out-of-band signals. The EEN policy control signals may comprise instructions and or requests for the PHY device 202. The layers above the MAC layer 306 may receive responses from the PHY device 202 via in-band and/or out-of-band physical signals. The out-of-band response signals may flow through the MAC controller 204 and/or may be delivered via the alternate path 316.

The PHY device 202 may comprise suitable logic, circuitry, interfaces and/or code that may be operable to improve energy efficiency for one or more PHY interfaces. In this regard, the PHY device 202 may be operable to implement an energy efficient network (EEN) control policy that may comprise lowering power levels during periods of little or no data traffic. For example, a PHY may be operable to enter a low power idle mode (LPI) and/or may lower its data rate to reduce power consumption. Management of the EEN control policy and/or decisions regarding when to enter and/or exit a low(er) power mode may originate from other parts of the system. For example, layers above the PHY layer may comprise the EEN control policy. Management of the EEN control policy may comprise approximating and/or monitoring transmit and/or receive traffic and/or determining when to enter and/or exit low(er) power modes. In addition, EEN control policy may take into consideration latency constraints for various types of traffic when determining wake and/or sleep periods. Latency may be introduced while a PHY device and/or a MAC controller transition from a period of low(er) power or a sleep period to a period of operation at a higher power. For example, in instances when latency is tolerable, a series of traffic bursts may be buffered for an acceptable amount of time before waking the PHY device 202 and/or MAC controller 204 for delivery of the accumulated traffic bursts.

In various embodiments of the invention, the PHY device 202 may receive EEN control policy control signals that may indicate when the PHY device 202 and/or the interface between the MAC controller 204 and the PHY device 202 may go into a reduced power mode and/or when to exit a reduced power mode. The EEN control policy control signals may comprise physical signals that may be received from one or more layers above the MAC layer 306. In this regard, the physical signals may be sent in-band and/or out-of-band. The in-band EEN control signals may comprise control characters that may be communicated to the PHY device 202 within a data stream, for example, within an interpacket gap (IPG), within a packet preamble and/or sent during a packet. The out-of-band EEN control signals may be communicated to the PHY device 202 via one or more control plane paths. An exemplary control plane path may comprise an MDIO bus of the MAC-PHY interface 318. The MAC controller 204 may communicate the out-of-band EEN control signals via the MDIO bus based on a management data clock (MDC) input in accordance with 802.3 standards. In this regard configuration parameters with the registers 314 may be read and/or modified based on the out-of-band EEN control signals. Alternatively, out-of-band EEN control signals may be communicated from the layers above the MAC controller 306 to the PHY device 202 via the alternate path 316. In this regard, the layers above the MAC 306 may generate EEN control signals for the PHY device 202 and send them to the PHY device 202 via a general purpose input output (GP10) bus, for example. The out-of-band signaling may be implemented in various ways. For example, a two state "on" or "off" signal may indicate LPI on and LPI off to the PHY device 202. Other protocols, for example, $I^2C$, O2 wire and/or proprietary methods may be utilized for the out-of-band signaling.

The PHY device 202 may comprise the PCS, PMA and/or PMD module 308 which may comprise suitable logic, circuitry, interfaces and/or code that may be operable to perform one or more of physical encoding and/or decoding, PMA framing and transmitter and/or receiver operations. In addition, the PHY device 202 may comprise the hardware, firmware and/or software module 312 that may be operable to implement LPI modes according to control policy instructions received by the PHY device 202. For example, the hardware, firmware and/or software module 312 may be operable to monitor and/or parse physical EEN control signals received by the PHY device 202 that may comprise information about entering and/or exiting a low(er) power mode and/or about buffering packets, for example. In addition, the hardware, firmware and/or software module 312 may receive requests for information such as statistical information from the layers above the MAC 306. The PHY device 202 may be operable to respond to the requests by generating physical signals comprising the statistical information and sending the physical signals to the layers above MAC 306.

In operation, the EEN control policy may be managed by the layers above the MAC layer 306 and may be communicated to the PHY device 202 via physical signaling. In this regard, the layers above the MAC layer 306 may determine that the PHY device 202 and/or the interface between the MAC controller 204 and the PHY device 202 may enter an LPI mode. The layers above the MAC layer 306 may send instructions to the PHY device 202 to transition to LPI mode. The instructions may be coded into control characters and sent to the PHY device via in-band physical signaling. For example, the control characters may be communicated to the PHY device 202 during an interpacket gap. The PHY device 202 and/or the interface between MAC controller 204 and the PHY device 202 may enter LPI mode.

Figure 4:
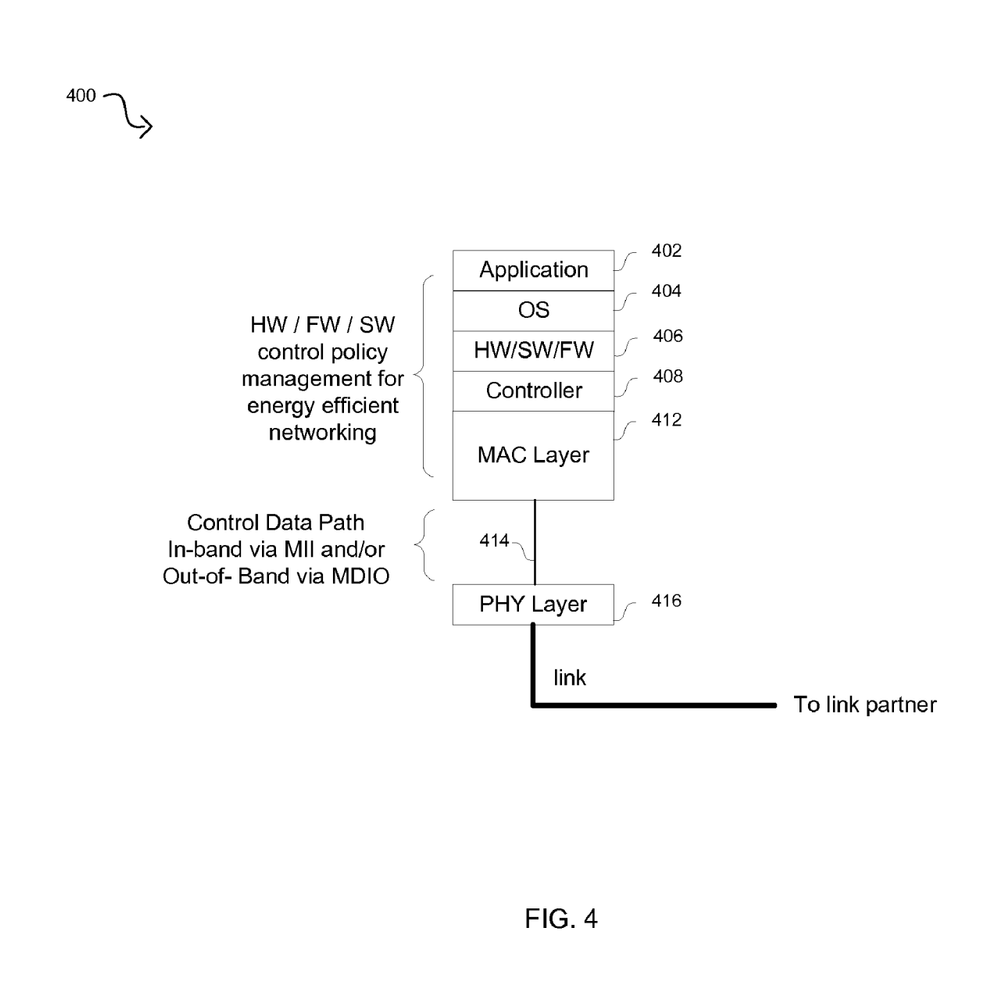
FIG. 4 is a block diagram illustrating exemplary OSI layers that are operable to support in-band and/or out-of-band energy efficient Ethernet network control signals, in accordance with an embodiment of the invention.

FIG. 4 is a block diagram illustrating exemplary OSI layers that are operable to support in-band and/or out-of-band EEN control signals, in accordance with an embodiment of the invention. Referring to FIG. 4, there is shown, a network device 400, the PHY layer 416, a media independent interface (MII) 414, the MAC layer 412, a controller layer 408, a hardware, software and/or firmware (HW, SW, FW) system 406, an operating system layer (OS) 404 and an application layer 402.

The PHY layer 416 may be implemented by the PHY device 202 and the MAC layer 412 may be implemented by the MAC controller 204. The PHY device 202 and MAC controller 204 are described with respect to, for example, FIG. 1, FIG. 2 and FIG. 3. The controller layer 408, the HW, SW, FW system 406, the operating system layer 404 and the application layer 402 may be similar or substantially the same as the layers above the MAC 306 described with respect to FIG. 3. The MII 414 may similar and/or the same as the MII 208 described with respect to FIG. 2. Although the network device 400 comprises a controller layer 408, the invention is not so limited. For example, the network device 400 may comprise a switch, a router and/or endpoint that may be operable to generate a packet via software.

The MAC controller 204 may each comprise suitable logic, circuitry, interfaces and/or code that may enable reception of Ethernet payloads from the application layer 402 and/or OS layer 404 via the controller layer 408 and/or the HW, SW, FW system 406. The controller layer 408 may be implemented in software, hardware and/or firmware. The 204 may enable encapsulation of the Ethernet payloads in one or more Ethernet frames. Additionally, the MAC controller 204 may be enabled to receive Ethernet frames from the MAC layer 412 and may enable decapsulation of the Ethernet frames to extract Ethernet payloads which may comprise, for example, multimedia, auxiliary, control, or general Ethernet data. In this regard, Ethernet payloads may be formatted and/or encapsulated according to one or more protocols. Other protocols may be utilized for the packetization and/or conveyance of data without deviating from the scope of the present invention. For example, IP may be utilized.

The network device 400 may comprise suitable logic, circuitry, interfaces and/or code for implementing networking functions. The network device 400 may be physically and/or logically divided into a plurality of layers comprising the PHY layer 416, the MAC layer 412, the controller layer 408, the HW, SW, FW system 406, the operating system layer 404 and the application layer 402. In various embodiments of the invention, an energy efficient network (EEN) control policy may be implemented at a layer above the MAC layer 412, for example, the control policy may be implemented within the controller layer 408. One or more layers above the MAC layer 412 may determine when the PHY device 202 and/or portions of the MAC controller 204 may enter and/or exit a low(er) power mode. In this regard, the layers above the MAC layer 412 may monitor and/or estimate past, present, and/or future traffic to determine when the PHY device 202 may enter a low(er) power mode and/or when it may exit a low(er) power mode, for example, LPI mode. The one or more layers above the MAC layer 412 may utilize physical signaling to communicate power mode transition instructions to the PHY layer 416. For example, the PHY layer 416 may receive the control characters via in-band and/or out-of-band signaling.

Similarly, the PHY device 202 may receive physical signaling from a layer above the MAC layer 412 that may request status of the PHY or may request statistical information. The PHY device 202 may generate a physical signal response for the higher layers. For example, the physical signal response may be sent via the MAC controller 204 to the layers above the MAC layer 412 that requested the information.

In instances when the PHY device 202 may be functioning in a LPI mode and may receive EEN control policy information indicating that a transition should be made from LPI mode to a fully operational communication state, the PHY device 202 may need time to make the transition. Data for communication to a link partner may be received by the MAC layer 412 and/or the PHY layer 416 before the PHY layer 416 has time to become fully awake and able to effectively transmit data across a link. In this instance, the data may be buffered until the PHY layer 416 is ready to transmit the packet data via one or more links to the link partner.

In various embodiments of the invention, a low(er) power mode may be initiated and/or ended based on a request received from a link partner of the network device 400. For example, the link partner may initiate LPI by sending a request to the layers above the MAC layer 412 that may send LPI control signals to the PHY layer 416. In asymmetric link partners, a single direction of a link partner may be operable to enter and/or exit a low(er) power mode independently of an opposite direction. On the other hand, in synchronous systems, both directions of a PHY device may enter and/or leave a low(er) power mode together.

In an exemplary embodiment of the invention, the MAC layer 412 and/or layers above the MAC layer 412 may be operable to manage in-band communication of EEN control policy information received from the layers above the MAC layer 412, to the PHY layer 416. In this regard, the MAC controller 204 may be operable to insert data bits such as control characters and/or code between packets within an inter-packet gap (IPG). For example, IPG control characters may indicate to the PHY device 202 that it should enter a low power idle mode (LPI). In a similar manner, the layers above the MAC layer 412 may be operable to insert control characters within a packet preamble and or within packet data to communicate the EEN control policy information from one or more layers above the MAC layer 412 to the PHY layer 416. For example, the MAC layer 412 may be operable to replace a data sequence within a packet preamble and/or within a packet with a bit sequence that the PHY layer 416 may recognize as the EEN control policy information. The bit sequence may indicate that the PHY device 202 may enter or exit a low(er) power mode. The PHY device 202 may inspect the data received from the MAC controller 204 and may interpret the control characters and may enter LPI.

Furthermore, the MAC layer 412 may be operable to utilize a signaling technique comprising Q ordered sets within a stream of data to indicate EEN control policy requests and/or commands to the PHY layer 416. In this regard, the MAC controller 204 may insert a sequence of symbols wherein the first symbol may be ∥Q∥, a second symbol may be D0 and a third symbol may be D1, for example. The ∥Q∥ symbol may be recognized by the PHY layer 416 as an indicator of impending control information and the D0 and/or D1 symbols may indicate which action to take with regard to EEN control policy. For example, D0 and/or D1 may indicate that the network device 400 may enter and/or exit an LPI mode. The MAC layer 412 may place the D0 and/or D1 symbols in a register that may be read out and sent to the PHY layer 416 in a Q ordered set when an EEN control policy is triggered by a layer above the MAC layer 412. In this manner legacy MAC controllers may be operable to implement the Q ordered sets for controlling low(er) power modes in the network device 400. Moreover, the Q ordered sets may be sent from the PHY device 202 to a link partner to so that the link partner may also enter a low(er) power mode.

The layers above the MAC layer 412 may be enabled to manage EEN control policy via out-of-band signaling to and/or from the PHY layer 416. For example, the layers above the MAC layer 412 may be operable to send out-of-band signaling via a MDIO bus within the MAC-PHY interface 318 described with respect to FIG. 3 and/or via an alternate out-of-band path 316, described with respect to FIG. 3.

In operation, within the network device 400, one or more layers above the MAC layer 412 may manage an EEN control policy. The one or more layers above the MAC layer 412 may monitor traffic in the network device 400 and may determine that traffic is not available for transmission and that a portion of the network device may enter a low power idle mode (LPI). For example, the higher layers may initiate an LPI mode by sending LPI control information to the MAC layer 412. In an exemplary embodiment of the invention, the MAC layer 412 may send the LPI control information to the PHY layer 416 via in-band signaling within a stream of data. For example, the MAC controller 204 may utilize one or more of control characters within an inter-packet gap, a data sequence within a preamble or a packet and Q ordered set symbols to convey the LPI control information. The PHY layer 416 may receive and/or buffer the LPI control information and may detect and/or interpret it. The PHY layer 416 may enter the LPI mode.

In instances when the network device 400 may be in a sleep state and/or a LPI mode, EEN control signals may indicate that packets are available for transmission. The MAC layer 412 and/or the PHY layer 416 may begin to exit the LPI mode but may receive packets before the PHY layer 416 is prepared to effectively transmit the packets to a link partner. In this instance, the packets may be buffered.

An exemplary EEN control policy instruction to the PHY device 202 may indicate to the PHY that entering and/or exiting an LPI mode for data transmission resources may only be implemented when data receive resources in the PHY device 202 enter and/or exit the LPI mode.

Figure 5A:
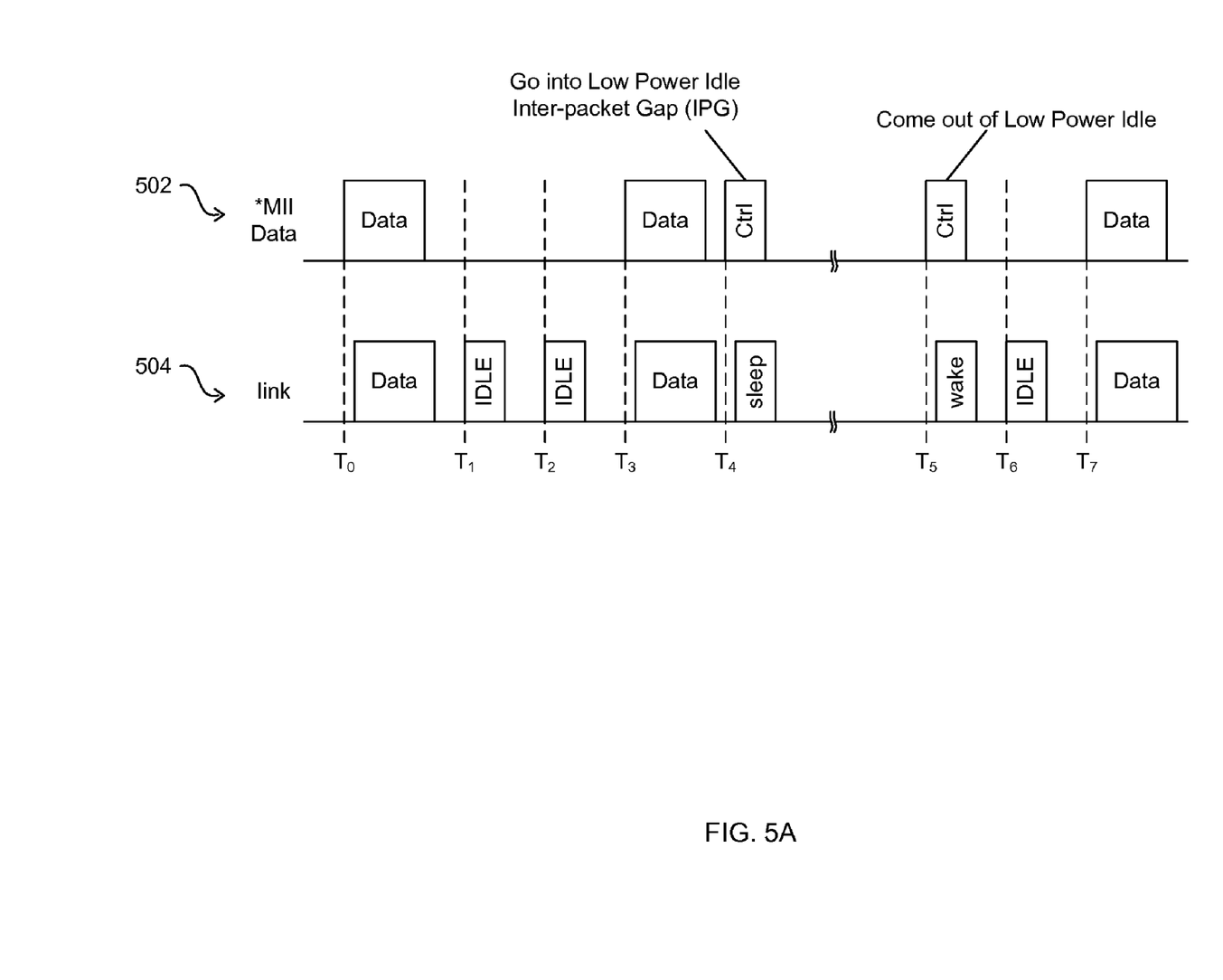
FIG. 5A is a block diagram illustrating exemplary in-band physical signaling that may be implemented via inter-packet gap control data, in accordance with an embodiment of the invention.

FIG. 5A is a block diagram illustrating exemplary in-band physical signaling that may be implemented via inter-packet gap control data, in accordance with an embodiment of the invention. Referring to FIG. 5A, there is shown, output from a media independent interface (MII) 502 and line output from a PHY device 504.

The MII output 502 comprises a data stream, which may be communicated between the MAC controller 204 and the PHY device 202 via the MAC-PHY interface 318. The PHY device output 504 may comprise a data stream communicated between the PHY device 202 and a link partner, for example, the link partner 104 described with respect to FIG. 1, via the link 112. At time instant $T_0$, the MAC controller 204 may send a packet data via the MII 414 to the PHY device 202. The PHY device 202 may receive the packet data, process it and transmit the packet data to the link partner 104 via the link 112. At the time instant $T_1$ and at the time instant $T_2$ there may be an inter-packet gap on the MII 414. The MAC controller 204 may not send packet data to the PHY device 202. Also at time instants $T_1$ and $T_2$, in the absence of packet data, the PHY device 202 may generate and transmit IDLE signals to the link partner 104 via the link 112. At time instant $T_3$ the MAC controller 204 may begin to transfer one or more data packets to the PHY device 202 and the PHY device 202 may process the data packets and may transmit them to the link partner 104 via the link 112.

At time instant $T_4$, the MAC controller 204 may not have data packets to deliver but may have EEN control policy information to send the PHY device 202. The MAC controller 204 may send one or more control codes to the PHY device 202 that may indicate that the PHY device 202 may enter a low power idle (LPI) mode. The PHY device 202 may enter LPI mode and may not send IDLE signals via the line 112 in order to reduce energy consumption. At time instant T5, the MAC controller 204 may send an IPG control signal to the PHY device 202 indicating that the PHY device 202 may wake up and prepare to transmit data. The PHY device 202 may be operable to wake circuitry, software and/or firmware. In instances when the PHY device becomes operational prior to receiving packet data for transmission, the PHY device 202 may send an IDLE signal on the link 112 to the link partner 104. At time instant T7, the MAC controller 204 may send packet data to the PHY device 202 via the MII 414. The PHY device may receive the packet data, may process it and may transmit it via the link 112 to the link partner 104.

Figure 5B:
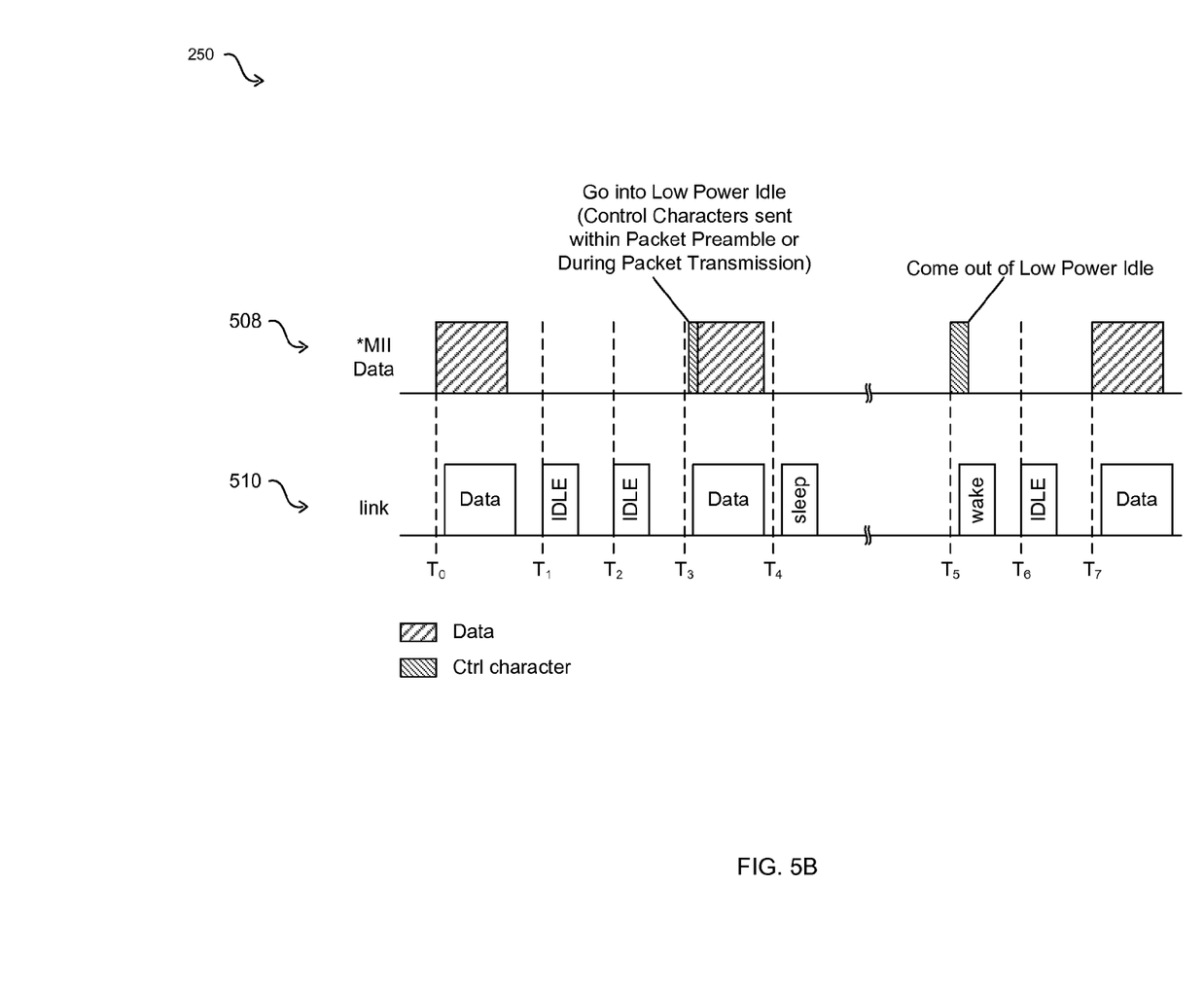
FIG. 5B is a block diagram illustrating exemplary in-band signaling that may be implemented via a packet preamble, via control characters sent during delivery of a packet and/or via Q ordered sets, in accordance with an embodiment of the invention.

FIG. 5B is a block diagram illustrating exemplary in-band signaling that may be implemented via a packet preamble, via control characters sent during delivery of a packet and/or via Q ordered sets, in accordance with an embodiment of the invention. Referring to FIG. 5B, there is shown, output from a media independent interface (MII) 508 and line output from a PHY device 510.

The MII output 508 comprises a data stream communicated between the MAC controller 204 and the PHY device 202 via the MII 412. The PHY device output 510 may comprise a data stream communicated between the PHY device 202 and a link partner, for example, the link partner 104 described with respect to FIG. 1, via the link 112. At time instant $T_0$, the MAC controller 204 may send packet data via the MII 414 to the PHY device 202. The PHY device 202 may receive the packet data, process it and transmit the packet data to the link partner 104 via the link 112. At time instant $T_1$ and at time instant $T_2$ there may be an inter-packet gap on the MII 414. The MAC controller 204 may not send packet data to the PHY device 202. Also at time instants $T_1$ and $T_2$, in the absence of packet data, the PHY device may generate and transmit IDLE signals to the link partner 104 via the link 112. At time instant $T_3$ the MAC controller 204 may begin to transfer one or more data packets to the PHY device 202 and the PHY device 202 may process the data packets and may transmit them to the link partner 104 via the link 112.

During the transfer of data via the MII 414, the MAC controller 204 may insert EEN control information within the data stream to indicate an LPI mode to the PHY device 202. For example, the MAC controller 204 may embed control bits in a packet preamble or within packet data. In addition, the MAC controller 204 may send Q ordered sets to the PHY device 202. At time instant T4, the MAC controller 204 and/or the PHY device 202 may be in LPI mode and/or may not transmit packet data. The PHY device 202 may not send IDLE signals via the line 112 in order to reduce energy consumption. At time instant T5, the MAC controller 204 may send control data to the PHY device 202 indicating that the PHY device 202 may wake up and prepare to transmit data. The PHY device may wake circuitry, software and/or firmware. In instances when the PHY device becomes operational prior to receiving packet data for transmission, the PHY device 202 may send one or more IDLE signals on the link 112 to the link partner 104. At time instant T7, the MAC controller 204 may send packet data to the PHY device 202 via the MII 414. The PHY device may receive the packet data, may process it and may transmit it via the link 112 to the link partner 104.

In various embodiments of the invention, the PHY device 202 may be operable to assist in implementation of the EEN control policy. In this regard, the PHY device 202 may comprise a FIFO and/or buffers that may comprise suitable logic, circuitry, interfaces and/or code that may be operable to store packets and/or frames prior to transmission. For example, in instances when the PHY device 202 is waking-up from a low(er) power mode, physical signaling may be received from higher layers while the PHY device 202 may need time to transition to an operational state. The PHY device 202 may store packets in the FIFO and/or buffer until the PHY device 202 is able to transmit them across the link. Similarly, a PHY within a link partner may also need to wake up and thus data may be buffered long enough for the PHYs in both link partners to exit LPI mode. In various embodiments of the invention, the MAC controller 204 may buffer packets.

The PHY device 202 may comprise timing and/or other parameters indicating the length of a sleep or wake cycle. Alternate signaling techniques between the PHY device 202 and MAC controller 204 may enable power mode transitions. The PHY device 202 may generate a frame for the MAC controller 204 that may instruct the MAC to enter a pause mode during a low(er) power mode and may generate a frame to exit the pause mode when exiting the low(er) power mode. Alternatively, the PHY may assert a carrier sense during low(er) power modes.

Figure 6:
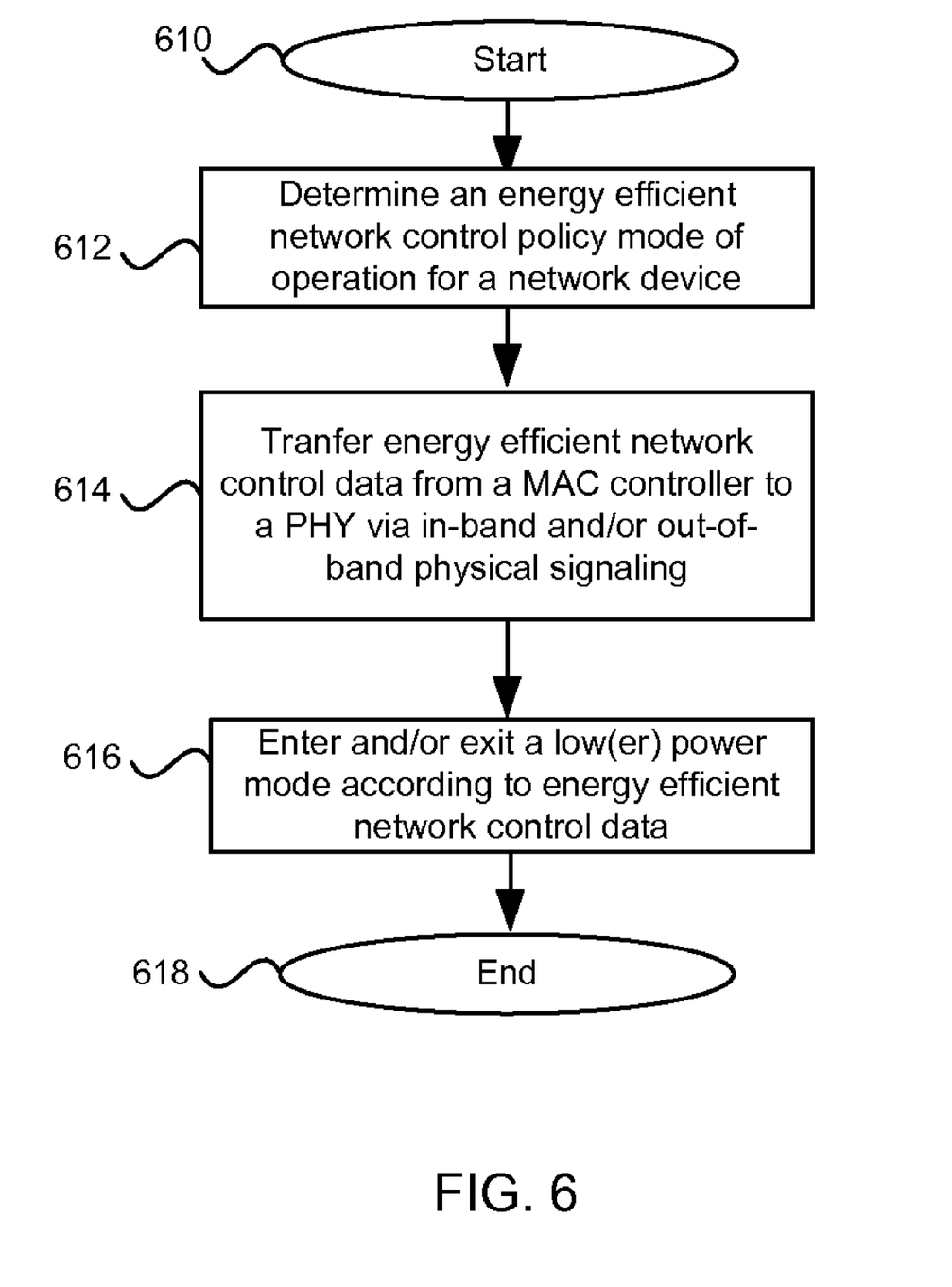
FIG. 6 is a flow diagram illustrating exemplary steps for implementing an energy efficient network control policy, in accordance with an embodiment of the invention.

FIG. 6 is a flow diagram illustrating exemplary steps for implementing an energy efficient network control policy, in accordance with an embodiment of the invention. The exemplary steps may begin with start step 610. In step 612, a layer above the MAC layer 412 may determine an energy efficient network control policy mode of operation for the network device 400. In step 614, the MAC controller 204 may transfer energy efficient network control data from the MAC controller 204 to the PHY device 202 via in-band and/or out-of-band physical signaling. In step 616, all or a portion of the network device 400 comprising the PHY device 202, may enter and/or exit a low(er) power mode according to the energy efficient network control data. Step 618 may be an end of exemplary steps.

In various embodiments of the invention, the PHY device 202 may receive a request for status or for statistical information from the layers above the MAC 306 via physical signaling. The PHY device 202 may respond to the request. For example, the PHY device 202 may communicate via in-band and/or out-of-band physical signaling that may comprise the requested statistical information.

In other embodiments of the invention, alternate methods of communication may be utilized to implement EEN control policy in the network device 400. For example, a combination of packet based communication and physical signaling may be utilized. In this regard, the packet based signaling may comprise a magic packet.

In accordance with an embodiment of the invention, the PHY device 202 may be operable assist in implementation of the EEN control policy. The PHY device 202 may determine when to buffer packets and/or when to transmit and/or to receive packets to and/or from a link partner. The PHY device 202 may comprise timing and/or other parameters indicating the length of a sleep or wake cycle. Alternate signaling techniques between the PHY device 202 and MAC controller 204 may enable power mode transitions. The PHY device 202 may generate a frame for the MAC controller 204 that may instruct the MAC to enter a pause mode during a low(er) power mode and may generate a frame to exit the pause mode when exiting the low(er) power mode. Alternatively, the PHY device 202 may assert a carrier sense during low(er) power modes.

The PHY device 202 may be operable to enter and/or exit a low(er) power mode based on stored or pre-defined information. For example, the PHY device 202 may boot up into a LPI or sub-rate state. Alternatively, configuration parameters for an LPI mode of operation may be stored within the PHY device 202 and may be implemented upon receiving a signal from the layers above the MAC layer 306, for example.

In an embodiment of the invention, an Ethernet network may comprise link partners 102 and/or 104 that are coupled via an Ethernet link 112, a communication control policy may specify a power level mode for one or more of the link partners 102 and/or 104. Control data indicating the power level mode may be communicated between a physical layer (PHY) device 202 and a media access (MAC) controller 204 for the one or more of the link partners 102 and 104. In this manner, one or more of the link partners 102 and 104 may operate in the power level mode based on the communicated control data. Furthermore, one or more of the link partners 102 and 104 may be configured for operation in the power level mode. One or more layers above an OSI media access controller layer in one or both of the link partners 102 and 104, may comprise hardware, software and/or firmware that may be operable to manage communication of the control policy. In this regard, control data may be inserted within an inter-packet gap and/or a data packet preamble to enable communication of the control data. The control data may be communicated to one or both of the physical layer device 202 and the media access controller 204, for the one or more of the link partners 102 and 104. Similarly, the control data may be inserted within a Q ordered set and communicated. The control data may be communicated between the media access controller 204 and the physical layer device 202 via the media independent interface 208. The PHY device 202 may respond to the control data by generating a response and sending it via an in band and/or out of band path. Accordingly, one or more of the link partners 102 and 104 may enter and/or exit a low power mode based on the communicated control data. Exemplary power level modes may comprise a low power idle and/or a sub-rate mode. In this regard, the communication control policy may comprise an energy efficient networking (EEN) control policy.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for physical signaling between a higher layer and a PHY to manage energy efficient network devices and/or protocols.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in an Ethernet network comprising link partners that are coupled via an Ethernet link, performing by a first of the link partners:
determining, by an energy efficiency control policy, a decision to transition from a first power level operating mode to a second power level operating mode, the decision being based on information received by the energy efficiency control policy from a physical layer device, the information enabling the energy efficiency control policy to make the determination using link utilization traffic measures;
communicating the decision that is determined by the energy efficiency control policy to the physical layer device in an inter-packet gap or a data packet preamble on an interface that couples the physical layer device and a media access controller for the first of the link partners; and
transitioning the physical layer device from the first power level operating mode to the second power level operating mode in response to receipt by the physical layer device of the communicated decision that is determined by the energy efficiency control policy.

2. The method according to claim 1, comprising managing the energy efficiency control policy by one or more of hardware, software and/or firmware, which is located in one or more layers above an open systems interconnect (OSI) media access controller layer in the first of the link partners.

3. The method according to claim 1, wherein the second power level operating mode comprises a low power idle mode and/or sub-rate mode.

4. The method according to claim 1, comprising communicating the decision that is determined by the energy efficiency control policy to a second of the link partners.

5. The method of claim 1, wherein the determining comprises determining based on link utilization traffic measures that are received by the energy efficiency control policy from the physical layer device.

6. A system for communication, the system comprising:
in an Ethernet network comprising link partners that are coupled via an Ethernet link, one or more circuits for use in a first of the link partners, the one or more circuits being operable to:
determine, by an energy efficiency control policy, a decision to transition from a first power level operating mode to a second power level operating mode, the decision being based on information received by the energy efficiency control policy from a physical layer device, the information enabling the energy efficiency control policy to make the determination using link utilization traffic measures;
communicate the decision that is determined by the energy efficiency control policy to the physical layer device in an inter-packet gap or a data packet preamble on an interface that couples the physical layer device and a media access controller of the first of the link partners; and
transition the physical layer device from the first power level operating mode to the second power level operating mode in response to receipt by the physical layer device of the communicated decision that is determined by the energy efficiency control policy.

7. The system according to claim 6, wherein the one or more circuits are operable to manage the energy efficiency control policy by one or more of hardware, software and/or firmware, which is located in one or more layers above an open systems interconnect (OSI) media access controller layer in one or both of the link partners.

8. The system according to claim 6, wherein the second power level operating mode comprises a low power idle mode and/or sub-rate mode.

9. The system according to claim 6, wherein the one or more circuits are operable to communicate the decision that is determined by the energy efficiency control policy to a second of the link partners.

10. The system of claim 6, wherein the energy efficiency control policy determines the decision using link utilization traffic measures received from the physical layer device.

11. A method for communication, the method comprising:
in an Ethernet network comprising link partners that are coupled via an Ethernet link, communicating by an energy efficiency control policy in a first of the link partners, to a physical layer device, via an interface that couples the physical layer device and a media access controller of the first of the link partners, a decision determined by the energy efficiency control policy to transition the physical layer device from a first power level operating mode to a second power level operating mode, the decision being based on information received by the energy efficiency control policy from the physical layer device, the information enabling the energy efficiency control policy to make the determination using link utilization traffic measures, wherein the decision is communicated in an inter-packet gap or a data packet preamble on the interface that couples the physical layer device and the media access controller; and
transitioning the physical layer device in the first of the link partners from the first power level operating mode to the second power level operating mode in response to receipt by the physical layer device of the communicated decision that is determined by the energy efficiency control policy; and
wherein the information is received from the physical layer device in response to a request for statistical information from one or more layers above the media access controller.

* * * * *